US009758066B2

(12) United States Patent  
Gallagher et al.

(10) Patent No.: US 9,758,066 B2  
(45) Date of Patent: Sep. 12, 2017

(54) SIDE SEAT HARNESS RESTRAINT SYSTEM

(71) Applicants: Kevin Gallagher, Phoenix, AZ (US); Dan Sjoquist, Cave Creek, AZ (US)

(72) Inventors: Kevin Gallagher, Phoenix, AZ (US); Dan Sjoquist, Cave Creek, AZ (US)

( * ) Notice: Subject to any disclaimer, the term of this patent is extended or adjusted under 35 U.S.C. 154(b) by 134 days.

(21) Appl. No.: 14/823,707

(22) Filed: Aug. 11, 2015

(65) Prior Publication Data

US 2017/0021795 A1    Jan. 26, 2017

Related U.S. Application Data

(60) Provisional application No. 62/035,704, filed on Aug. 11, 2014.

(51) Int. Cl.
| | |
|---|---|
| *B60N 2/24* | (2006.01) |
| *B60R 22/02* | (2006.01) |
| *B60R 22/26* | (2006.01) |
| *B60R 22/34* | (2006.01) |

(52) U.S. Cl.
CPC ............. *B60N 2/24* (2013.01); *B60R 22/023* (2013.01); *B60R 22/26* (2013.01); *B60R 2022/027* (2013.01); *B60R 2022/266* (2013.01); *B60R 2022/3424* (2013.01)

(58) Field of Classification Search
None
See application file for complete search history.

(56) References Cited

U.S. PATENT DOCUMENTS

| | | | | |
|---|---|---|---|---|
| 5,215,354 | A  * | 6/1993 | Grene ...................... | B60N 2/24 297/466 |
| 5,352,024 | A  * | 10/1994 | Grene ...................... | B60N 2/24 297/466 |
| 6,767,057 | B2 | 7/2004 | Neelis | |
| 7,758,130 | B2 * | 7/2010 | Jay .......................... | B60R 22/00 297/465 |
| 8,375,472 | B2 * | 2/2013 | Ashline ................ | A42B 3/0473 2/421 |
| 9,351,529 | B1 * | 5/2016 | Ashline ................ | A42B 3/0473 |
| 2012/0274056 | A1 * | 11/2012 | Fan ......................... | B60R 22/00 280/801.1 |
| 2015/0084323 | A1 * | 3/2015 | Han ........................ | B60R 22/14 280/807 |

FOREIGN PATENT DOCUMENTS

WO     WO 2013188614 A1 * 12/2013  ........... B60R 22/023

* cited by examiner

*Primary Examiner* — David E Allred  
(74) *Attorney, Agent, or Firm* — Venjuris, P.C.

(57) ABSTRACT

A harness and restraint system for side facing seats, which is asymmetric and unique for each side of the vehicle. The absence of a leading shoulder strap minimizes neck and cervical injury in the event of impact from the front of the vehicle, such impact being the most likely direction of impact. The combination of internally mounted automatic locking restraint and fixed or automatic locking lap belt and asymmetric harness geometry captures the trailing shoulder reducing rotation and also provides restraint for the pelvis and torso during lateral impacts.

11 Claims, 6 Drawing Sheets

SIDE SEAT HARNESS RESTRAINT SYSTEM

CROSS-REFERENCE TO RELATED APPLICATIONS

This application claims priority to U.S. Provisional Application No. 62/035,704, which was filed on Aug. 11, 2014, the contents of which are incorporated by reference as though fully set forth herein.

BACKGROUND OF THE INVENTION

Description of the Related Art

All vehicle types with side facing seating share one thing in common: seats that are contrary to what both practical experience and empirical data have shown to be safe in passenger vehicles. Side facing seats are well-documented to result in substantial increases in passenger injury compared to forward facing seats. Used in a side facing position, most common seats and restraints are outside of their original design, engineering and testing parameters since they are designed for forward-facing use in compliance with the Federal Motor Vehicle Safety Standards. There is currently no applicable section of the Federal Motor Vehicle Safety Standards relating to seating and restraints in the rear compartments of ambulances, military and other specialty vehicles. A recent study published by the FAA in July of 2011 "Neck Injury Criteria for Side Facing Aircraft Seats" provided the latest validation of the fact that side facing seats create dangerous neck loading.

Taking a closer look at ambulances as an example provides a clear illustration of the problem. Of the seating positions that are typically available in most ambulances in the United States, side facing seats are by far the most common. These seats can be very versatile, and offer the best access to the patient. They also represent some unique and serious hazards to the attendant seated in them that are not addressed by any seat and restraint systems currently available.

Ambulance crash data available from the CDC shows that 79% of ambulance crashes are from the front of the vehicle. Impacts from this direction can result in severe lateral loads being placed on both passengers and harness systems in side facing seats and restraints. One of the most serious problems is the potential for severe neck injury caused by impingement of the cervical region by the over the shoulder belt that is toward the direction of impact. The acute lateral loading also results in the belt retractors that are integral to both lap belts and harness systems deploying at a much more severe angle than they are designed for. That can result in retarded retractor locking and allow the passenger's body to travel excessively beyond acceptable limits for proper function of the restraint system. Therefore, a heretofore unaddressed need exists in the art to address these and other problems.

BRIEF SUMMARY OF THE INVENTION

A restraint system specifically designed to address the unique problems of restraining passengers in side facing seats. Due to the directional and asymmetric nature of the harness design, there is no leading over the shoulder strap to interfere with the deceleration of the neck and cervical spine. This eliminates the potential injury caused by that strap impinging on the neck during a crash. The bilateral torso straps restrain the trunk and minimize thoracic excursion, while the trailing shoulder strap and chest strap combine to restrain the trailing shoulder and minimize thoracic twisting and lumbar loading. They attach to either Automatic Locking Retractors (ALR) or locking latchplate lap belts which anchor the thoracic harness system and provide pre-crash locked restraint for the pelvis. The harness adjustment strap anchored by the lap belt and ALRs tightens in opposition to the trailing shoulder strap to allow the rotary buckle to be correctly positioned on the chest. An optional adjustable crotch strap provides downward traction and support to the harness while restricting lateral movement of the lower extremities. This invention is directionally restricted; each seat is designed for use only on one side of a vehicle, determined by whether the leading and restraining straps are constructed on the left or right side of the chair.

The foregoing and other features and advantages of the side seat harness restraint system will be apparent to those of ordinary skill in the art from the following more particular description of the invention and the accompanying illustrations.

BRIEF DESCRIPTION OF THE DRAWINGS

The components of the drawing are not necessarily to scale, emphasis instead being placed upon illustrating the principles of the side seat harness restraint system. Like reference numerals designate corresponding parts throughout the several views.

COMPONENT LEGEND FOR THE DRAWINGS

Figure 4:
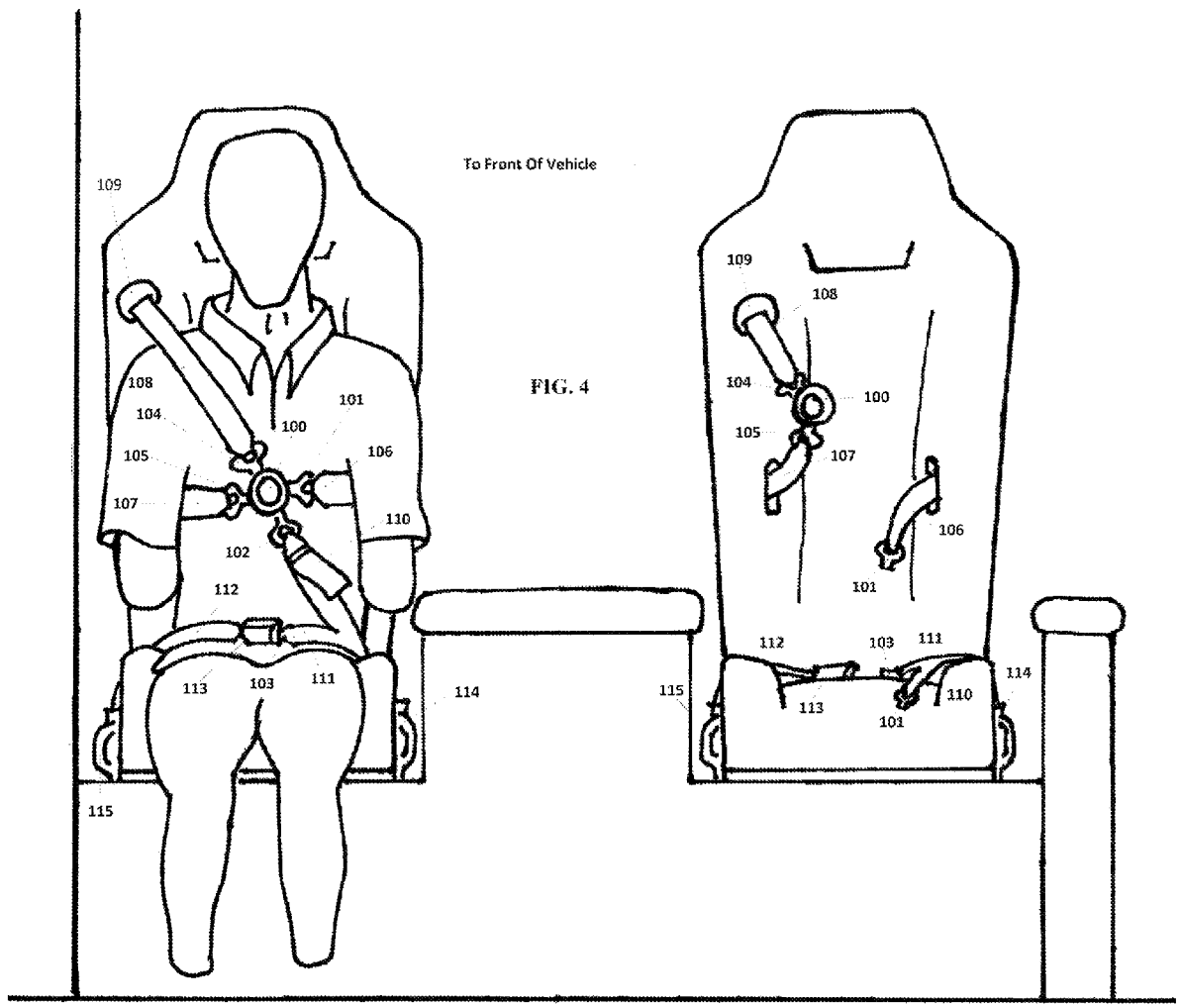
FIG. 4 is an external view of the harness system in wall mounted side seats.

100—rotary buckle receiver
101—leading torso belt latch plate (releasable at rotary buckle 100)
102—harness adjustment belt releasable latch plate (releasable at rotary buckle 100)
103—leading lap belt latch plate (releasable at lap belt buckle receiver 113)
104—trailing shoulder belt fixed latch plate (fixed at rotary buckle 100)
105—trailing torso belt fixed latch plate (fixed at rotary buckle 100)
106—leading torso restraint belt (originates at ELR—FIG. 2, 116)
107—trailing torso restraint belt (originates at ELR—FIG. 2, 117)
108—trailing shoulder restraint belt (originates at ELR—FIG. 2, 118)
109—bezel
110—harness adjustment belt
111—leading lap belt (originates at ALR—FIG. 4, 114)
112—trailing lap belt (originates at ALR—FIG. 4, 115)

113—buckle receiver
114—second automatic locking retractor (ALR)
115—first automatic locking retractor (ALR)
116—first emergency locking retractor (ELR)
117—second emergency locking retractor (ELR)
118—third emergency locking retractor (ELR)
119—first trailing torso restraint redirector
120—second trailing torso restraint redirector
121—first leading torso restraint redirector
122—second leading torso restraint redirector
123—trailing shoulder restraint redirector
124—crotch strap
126—crotch strap lockplate
127—trailing lap belt locking latchplate
128—trailing lap belt fixed anchor point

DETAILED DESCRIPTION OF THE INVENTION

For the purposes of this patent, "leading" refers to a component orientated toward the front of the vehicle, while "trailing" refers to a component oriented toward the rear of the vehicle.

Figure 1:
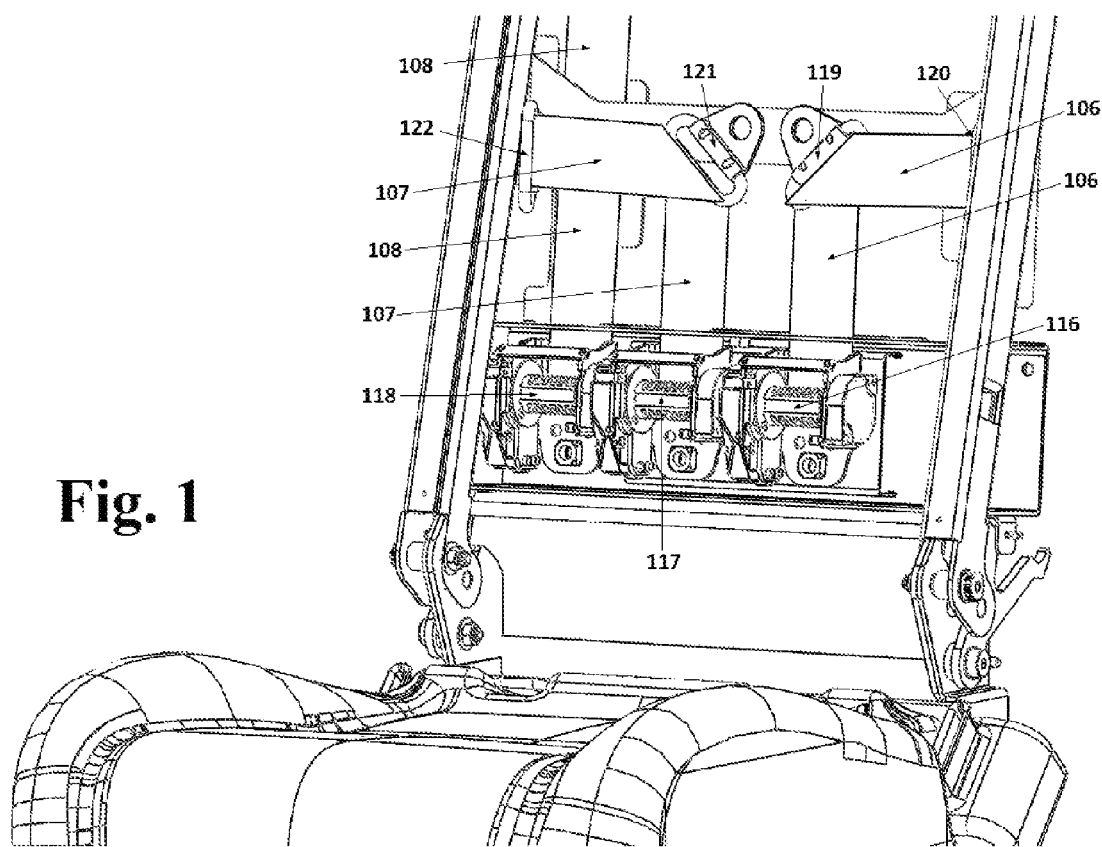
FIG. 1 is a close up view of the internal retractors, redirectors and belt path of the harness system as found inside the seat.

FIG. 1 illustrates the preferred embodiment. An internally-mounted first emergency locking retractor 116 supplies a leading torso restraint belt 106 routed to a first leading torso restraint redirector 121 which changes the direction of said leading torso restraint belt 106 travel 270 degrees to a second leading torso restraint redirector 122 which further changes the direction of belt travel 90 degrees. An internally-mounted second emergency locking retractor 117 supplies a trailing torso restraint belt 107 routed to a first trailing torso restraint redirector 119 which changes the direction of said trailing torso restraint belt 107 travel 270 degrees to a second trailing torso restraint redirector 120 which further changes the direction of belt travel 90 degrees.

Figure 2:
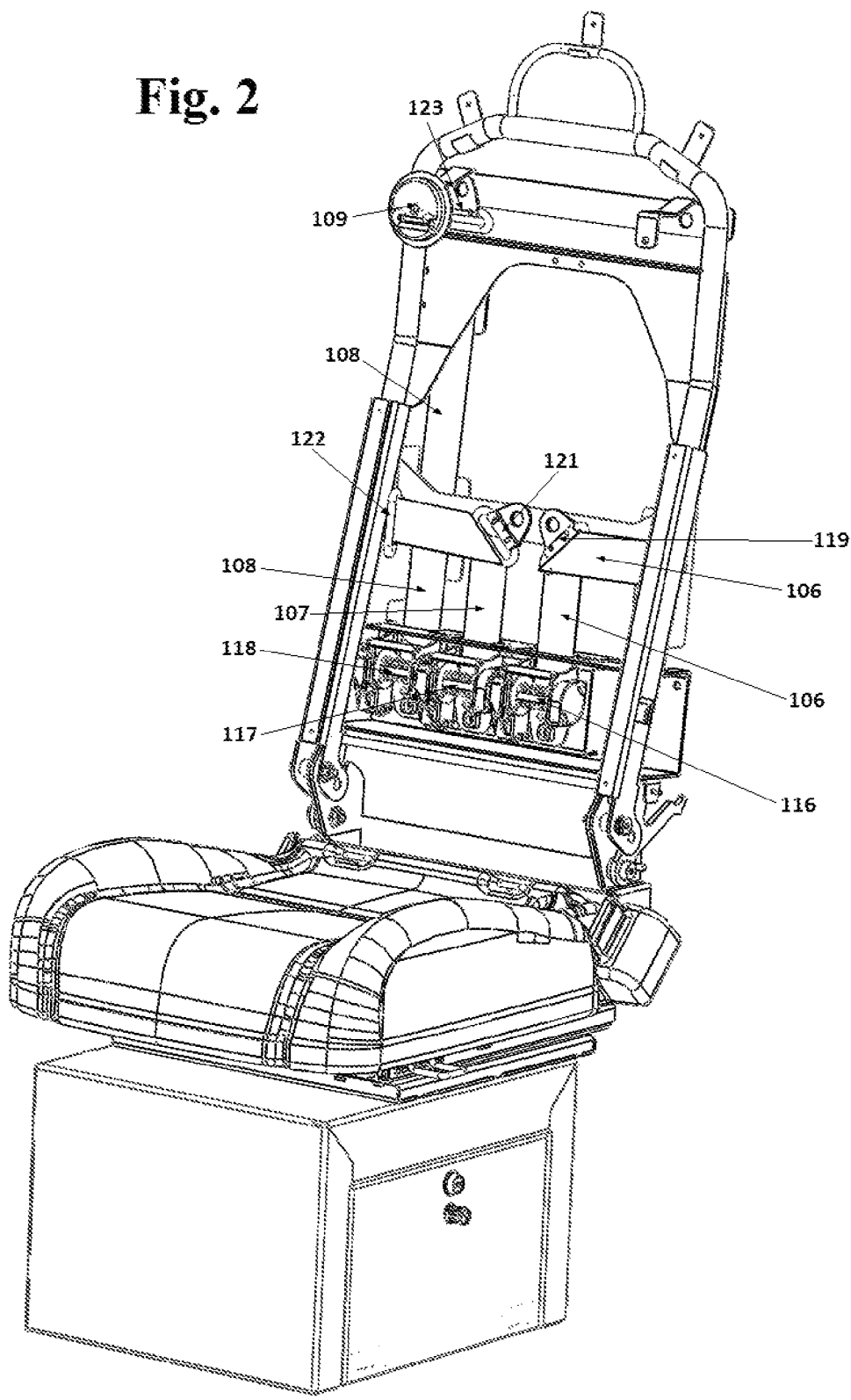
FIG. 2 is a full view of the internal retractors, redirectors and belt path of the harness system as found inside the seat.

FIG. 2 further illustrates the preferred embodiment. An internally-mounted third emergency locking retractor 118 supplies a trailing shoulder restraint belt 108 routed to a trailing shoulder restraint re-director 123 which changes the direction of said trailing shoulder restraint belt 108 travel 90 degrees and is routed through a bezel 109.

Figure 3:
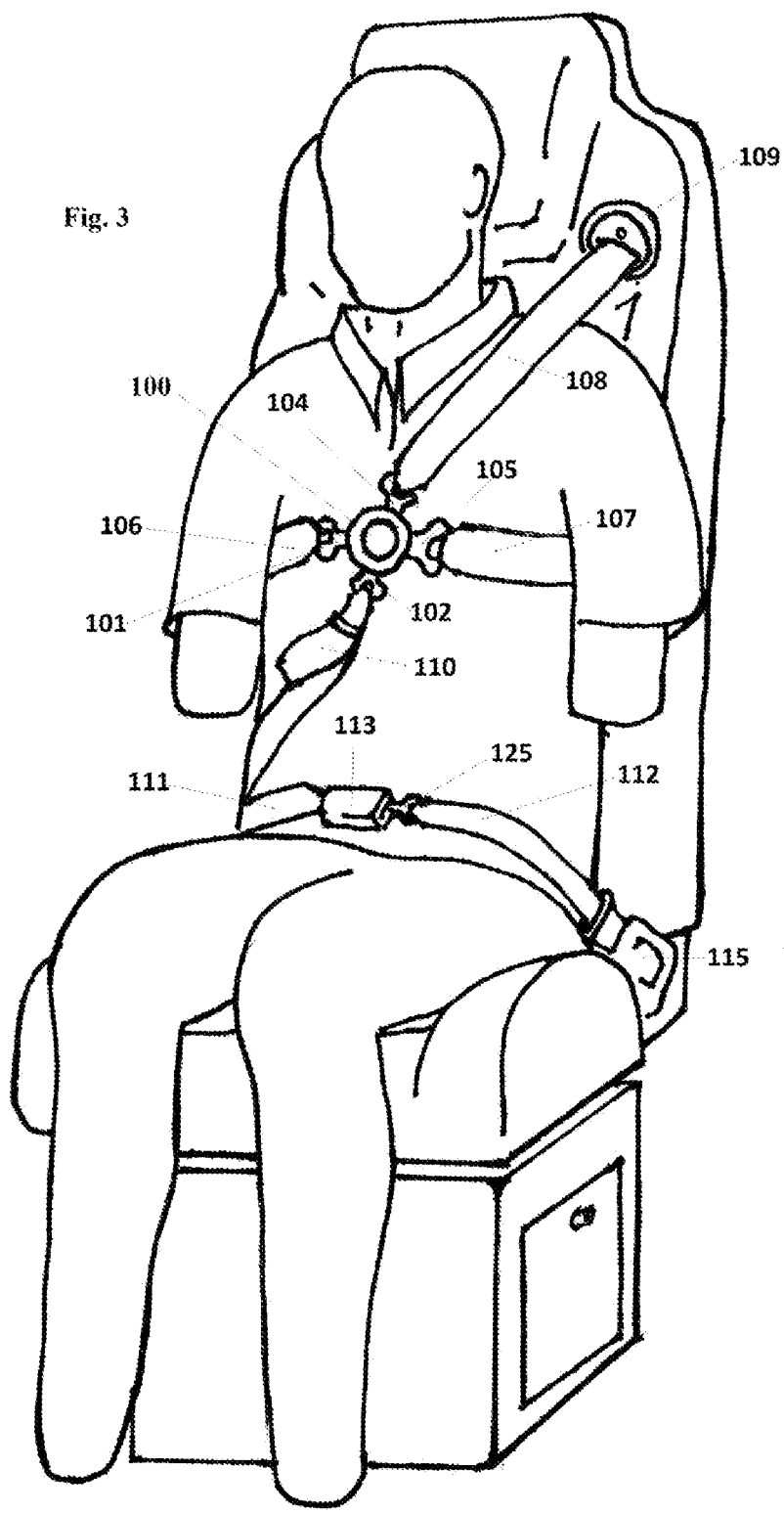
FIG. 3 is an external view of the harness system in a free standing side seat.

FIG. 3 further illustrates the preferred embodiment. A rotary buckle receiver 100 receives the leading torso restraint belt 106, the trailing torso restraint belt 107, the trailing shoulder restraint belt 108, and a leading harness adjustment belt 110. The rotary buckle receiver 100 further comprises a leading torso belt latch plate 101, a harness adjustment belt releasable latch plate 102, a trailing torso belt fixed latch plate 105, and a trailing shoulder belt fixed latch plate 104.

FIG. 4 further illustrates the preferred embodiment. A first automatic locking retractor 115 supplies a trailing lap belt 112 which is fixed to a buckle receiver 113, which may be engaged with leading lap belt latch plate 103. A second automatic locking retractor 114, supplies a leading lap belt 111, which is fixed to the lap belt latch plate 103, which may be received by the buckle receiver 113. A rotary buckle receiver 100, is fixed to the trailing torso restraint belt 107 with a trailing torso belt fixed latch plate 105 and further fixed to the trailing shoulder restraint belt 108 such that the assembly of the rotary buckle receiver 100, trailing torso restraint belt 107 and trailing shoulder restraint belt 108 act as a sling to capture and restrain the trailing shoulder of the seat occupant. In the preferred embodiment, the trailing torso restraint belt 107 and trailing shoulder restraint belt 108 cannot be disengaged from the rotary buckle receiver 100 during normal operation.

Figure 5:
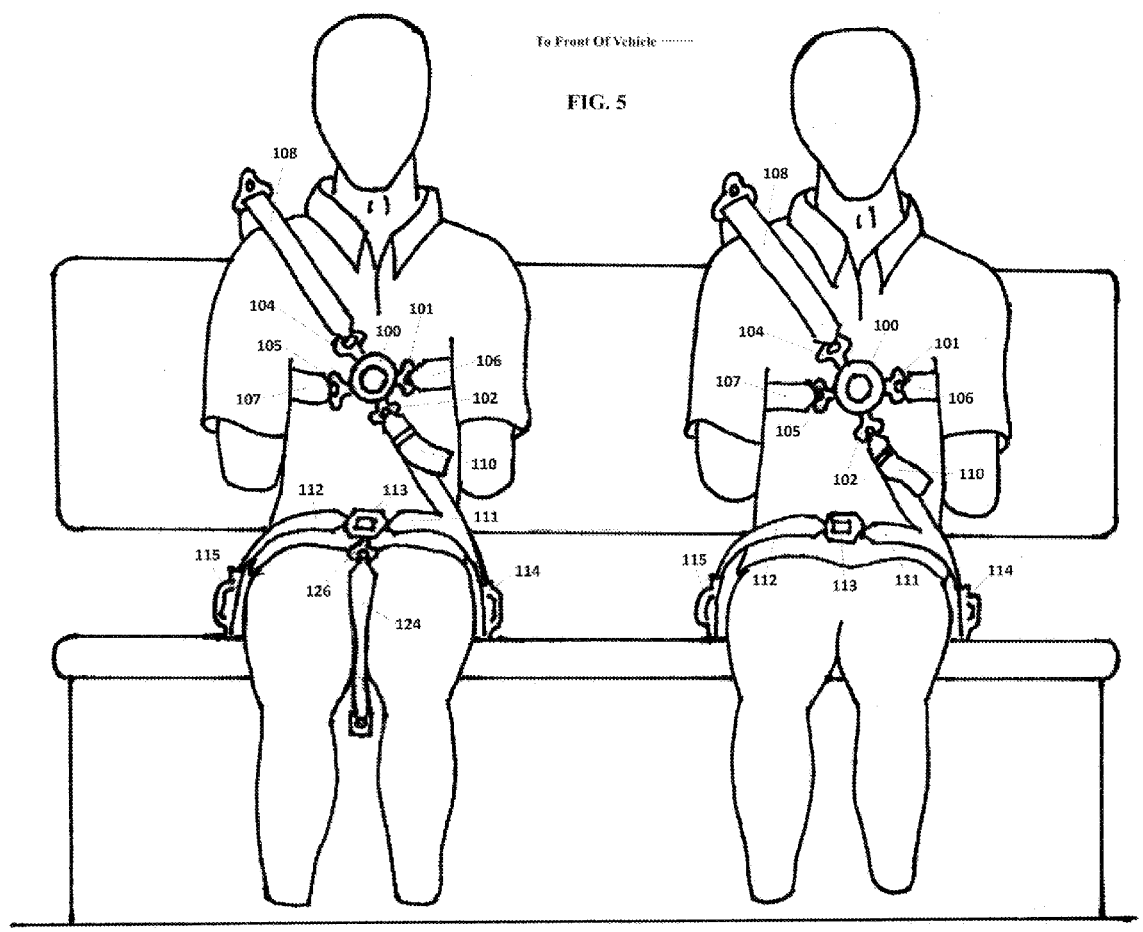
FIG. 5 is an external view of the harness system in an integrated bench type side seat showing the optional crotch strap installed.

FIG. 5 illustrates an alternate embodiment which further comprises a crotch strap 124. Said crotch strap 124 is fixed to a crotch strap lockplate 126, which is received by the buckle receiver 113 to add an additional point of restraint for a user's pelvis.

Figure 6:
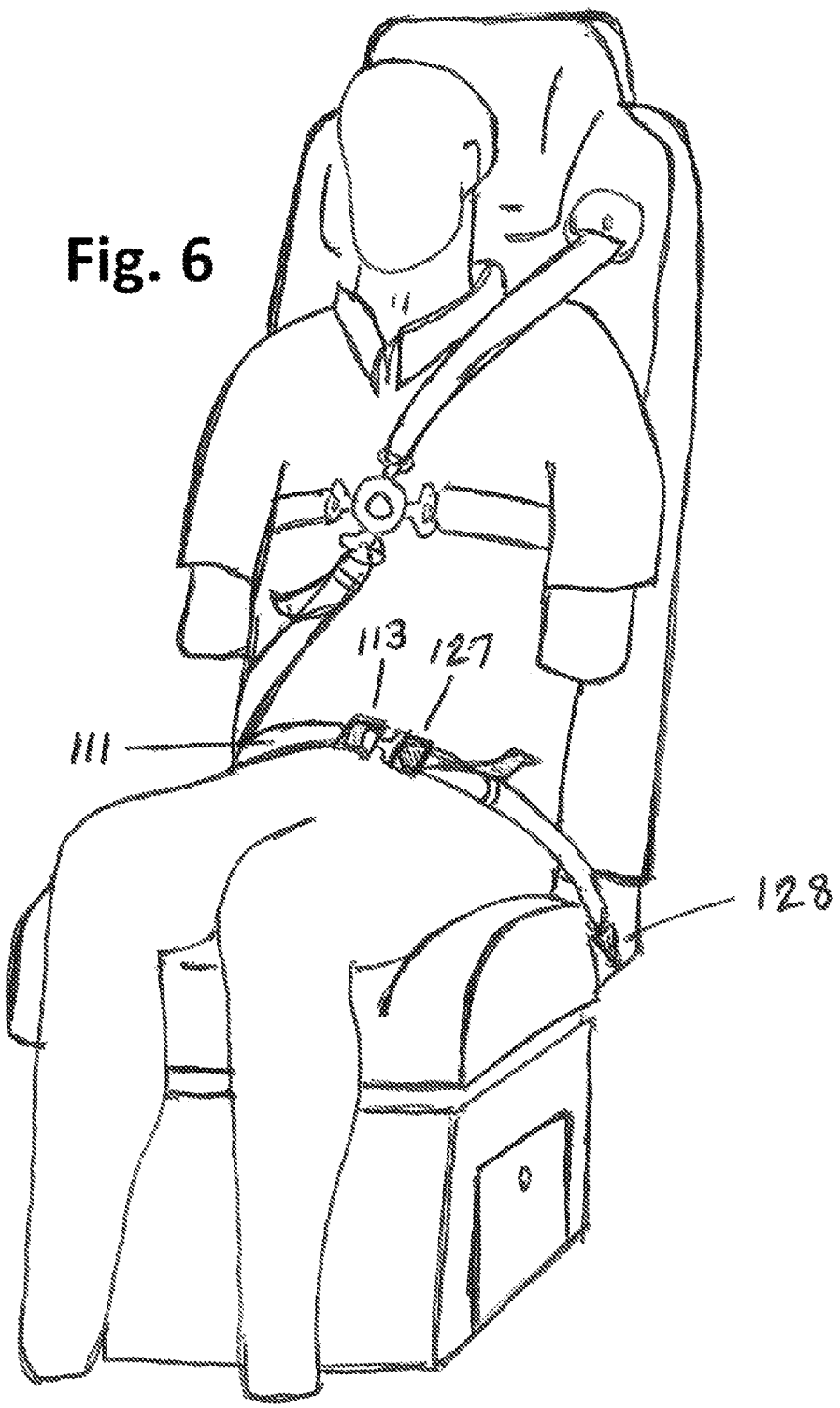
FIG. 6 is an external view of the harness system in a free standing side seat showing an alternative installation using fixed lap belt anchor points and a locking lap belt latchplate instead of automatic locking retractors.

FIG. 6 illustrates another alternate embodiment wherein a trailing lap belt fixed anchor point 128, is attached to the trailing lap belt 112, which is engaged through a trailing lap belt locking latchplate 127, which may be received by the buckle receiver 113. In this embodiment, the leading lap belt 111 is fixed in place at one end rather than connected to an automatic locking retractor as in the preferred embodiment. At its opposite end, said leading lap belt 111 is fixed to a buckle receiver 113.

The embodiments of the present invention described above, particular the preferred embodiments, merely set forth a clear understanding of the principles of the invention. Many variations and modifications may be made to the above described embodiments of the invention without departing substantially from the spirit and principles of the invention. All such modifications and variations are intended to be included herein within the scope of this disclosure and the present invention and protected by the following claims.

The invention claimed is:

1. A mounting direction specific, asymmetric restraint system for use in a vehicle, comprising:
   a seat, said seat further comprising a seat back and a seat bottom,
   a rotary buckle, said rotary buckle further comprising two fixed latches and two releasable latches;
      wherein one of said two fixed latches is attached to a trailing shoulder belt and another of said two fixed latches is attached to a trailing torso belt, said trailing shoulder belt and said trailing torso belt configured as a retention sling for a user's trailing shoulder;
      wherein one of said two releasable latches is attached to a leading torso belt and another of said two releasable latches is attached to a harness adjustment strap;
   a lap belt buckle with at least one releasable latch position, said lap belt buckle attached to either two automatic locking retractors or fixed belts with locking latchplates;
   one shoulder belt originating at a shoulder belt emergency locking retractor;
   a trailing torso restraint belt and a leading torso restraint belt originating at respective trailing and leading torso restraint belt emergency locking retractors;
   a leading lap belt and a trailing lap belt which mate with the lap belt buckle and which originate at either said fixed belts with locking latchplates or said automatic locking retractors;
   wherein one end of said harness adjustment strap is permanently fixed to the leading lap belt and an opposite end of said harness adjustment strap comprises a releasable latch configured to be releasably mated to the rotary buckle, and wherein the opposite end of the harness adjustment strap includes a length adjustable connection of a strap portion of the harness adjustment strap to the releasable latch that is attached to the rotary buckle; and
   belt redirectors providing directional guidance to the torso and shoulder belts.

2. The restraint system of claim 1, wherein the shoulder belt is oriented in a trailing position.

3. The restraint system of claim 1, wherein the restraint system comprises five belt redirectors.

4. The restraint system and five belt redirectors of claim 3, wherein the belt redirectors are configured at 90° and 270° positions relative to a traveling direction of the belt.

5. The restraint system of claim 1, wherein the restraint system further comprises a crotch strap configured to mate with the lap belt buckle.

6. The restraint system of claim 1, wherein the shoulder belt is fixed to the rotary buckle.

7. The restraint system of claim 1, wherein the trailing torso belt is fixed to the rotary buckle.

8. The restraint system of claim 1, wherein the harness adjustment strap is configured to pull in opposition to the shoulder strap such that a user may adjust position of the rotary buckle.

9. The restraint system of claim 1, wherein the rotary buckle is permanently fixed to the trailing shoulder strap and the trailing torso strap.

10. The restraint system of claim 1, wherein at least two of the emergency locking retractors are positioned within or adjacent to the seat back.

11. The restraint system of claim 1, wherein an adjustable crotch strap buckles into a bottom of the lap belt buckle.

* * * * *